United States Patent

[11] 3,581,654

| [72] | Inventor | John C. Tescula |
| | | 22810 Westwood Road, Fairview Park, Ohio 44126 |
| [21] | Appl. No. | 876,693 |
| [22] | Filed | Nov. 14, 1969 |
| [45] | Patented | June 1, 1971 |

[54] VERTICAL ELECTRIC GRILL UNIT
5 Claims, 7 Drawing Figs.

[52] U.S. Cl. ................................................. 99/399,
99/400, 99/402, 99/446, 219/521
[51] Int. Cl. .................................................. A47j 37/08,
H05b 3/06
[50] Field of Search ............................................ 219/521,
532; 99/390—2, 399—400, 402, 446; 126/25

[56] References Cited
UNITED STATES PATENTS

| 2,480,458 | 8/1949 | Fleck | 99/399 |
| 2,821,187 | 1/1958 | Tescula | 99/390X |
| 2,831,096 | 4/1958 | Signore, Jr. | 219/521X |
| 2,900,482 | 8/1959 | Aylor | 219/521 |
| 2,941,463 | 6/1960 | Di Cuia | 99/402X |
| 3,096,706 | 7/1963 | Cardwell | 99/400X |

*Primary Examiner*—Volodymyr Y. Mayewsky
*Attorney*—Meyer, Tilberry and Body

ABSTRACT: An electric grill for grilling foodstuffs and the like comprising a first generally U-shaped frame member having a bottom wall and vertically extending end walls with the top and sides of the member being open. Flanges extend inwardly from the marginal edges of the bottom and sidewalls and a second frame member of generally rectangular configuration with open sidewalls is positioned within the first frame member and spaced a short distance therefrom. A resistance heating element is carried by the second frame member generally centrally thereof and grid members are positioned across the open sides of the first frame member and slidably received on its flanges. Additionally, leg and food support assemblies are removably connected to the first frame member.

Patented June 1, 1971

INVENTOR.
JOHN C. TESCULA
BY
Meyer, Tilberry & Body
ATTORNEYS.

Patented June 1, 1971 3,581,654

INVENTOR.
JOHN C. TESCULA
BY
Meyer, Tilberry & Body
ATTORNEYS.

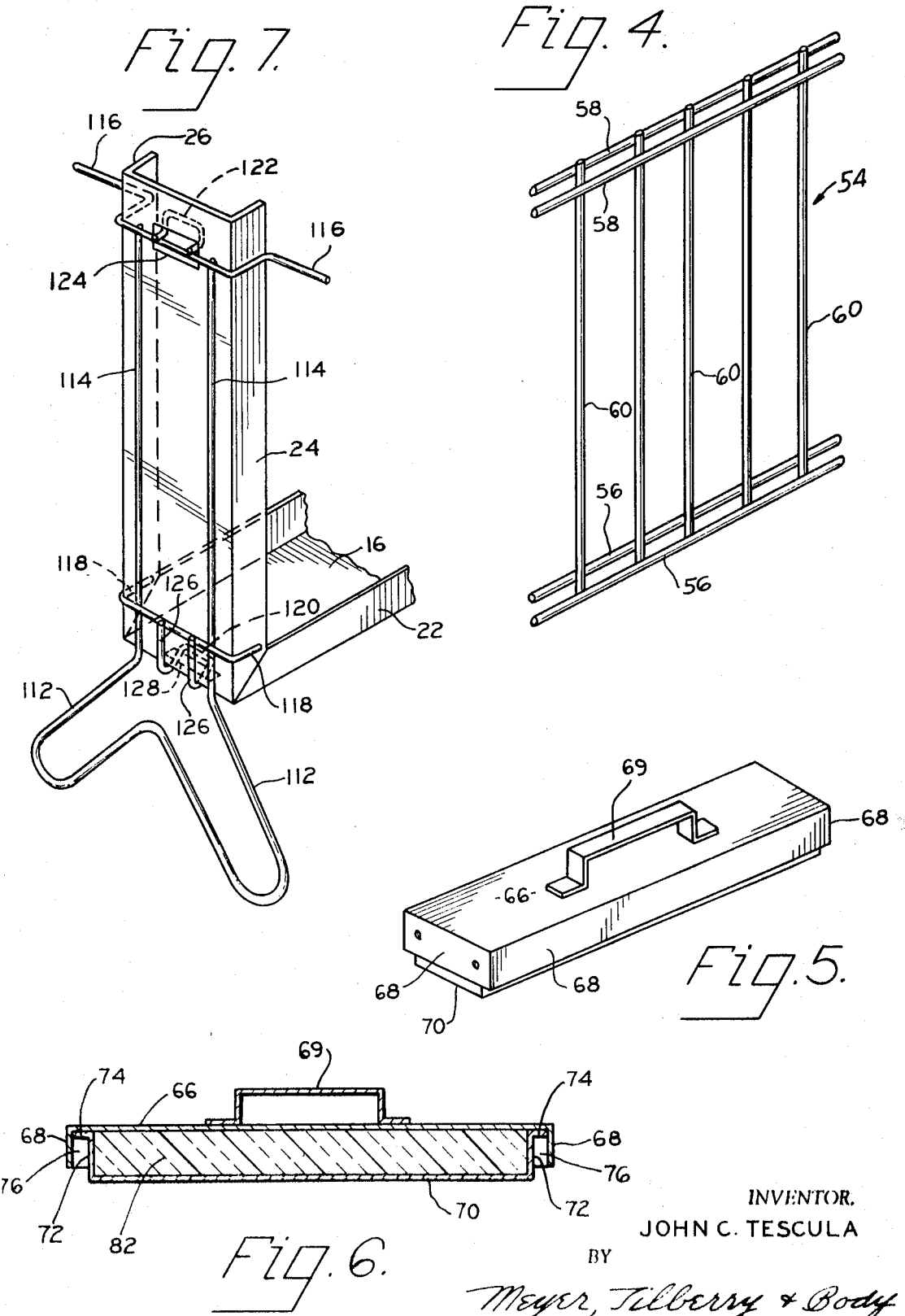

VERTICAL ELECTRIC GRILL UNIT

The subject invention is directed toward the grill art and, more particularly, to an improved vertically arranged, portable electric grill.

The invention is especially suited for use in grilling meat and will be described with particular reference thereto; however, it will be appreciated the invention is capable of broader application and could be used for grilling or cooking a large variety of foodstuffs.

Many different types of portable electric grills are currently available. Most of them are arranged with the heating element mounted horizontally and the food support mounted thereabove. This type of grill has certain disadvantages. For example, a relatively large heating element is required if the device is to be capable of providing sufficient cooking area. Secondly, are encountered with grease and meat juices dripping on the heating elements and causing smoking and charring. Additionally, the units are difficult to clean.

Some electrical broilers have been made with pairs of electric heating elements extending vertically in laterally spaced relationship. The food support or holder is arranged to hang between the two elements so that the meat or other food is cooked simultaneously from both sides. This type of broiler is somewhat more satisfactory than the previously mentioned horizontal grills; however, they are more expensive and complex to manufacture. Also, they are difficult to clean and can grill only a limited amount of food at a time.

The present invention overcomes the above problems and provides a vertical type broiler which is extremely simple to construct and wherein there are no problems with cleaning. Additionally, the unit is arranged so that it can be easily assembled and disassembled.

In accordance with the present invention there is provided an improved vertical electric grill for grilling foodstuffs and the like. The grill comprises a first generally U-shaped frame member having a bottom wall and vertically extending end walls with the top and sides of the member being open. Flanges extend inwardly from the marginal edges of the bottom and sidewalls and a second frame member of generally rectangular configuration having open sidewalls is positioned within the first frame member and spaced a short distance therefrom. A resistance heating element is carried by the second frame member generally centrally thereof and grid members are positioned across the open sides of the first frame member and slidably received on the flanges. Additionally, leg and food support assemblies are removably connected to said first frame member.

Accordingly a primary object of the invention is the provision of a simple vertical grill which is easy to construct.

Another object is the provision of a grill which can be constructed entirely from easily formed sheet metal and wire parts.

Still another object is the provision of a grill of the type described which is easy to assemble.

A further object is the provision of a grill which is easy to clean and can be disassembled with a minimum of effort.

A still further object is the provision of a grill of the type described which is both rugged and of pleasing appearance.

Yet another object is the provision of a grill which is easy to use and wherein a single heating element can cook twice as much as similar prior grills.

These and other objects and advantages will become apparent from the following description when read in conjunction with the accompanying drawings wherein:

FIG. 4 shows one of the grid elements utilized in the FIG. 1 embodiment;

FIG. 5 and 6 are, respectively, a pictorial view and a cross-sectional view through the top member of the FIG. 1 structure; and, FIG. 7 is a pictorial and view showing a grill formed in accordance with the invention and having a modified leg and grill support structure.

Figure 1:
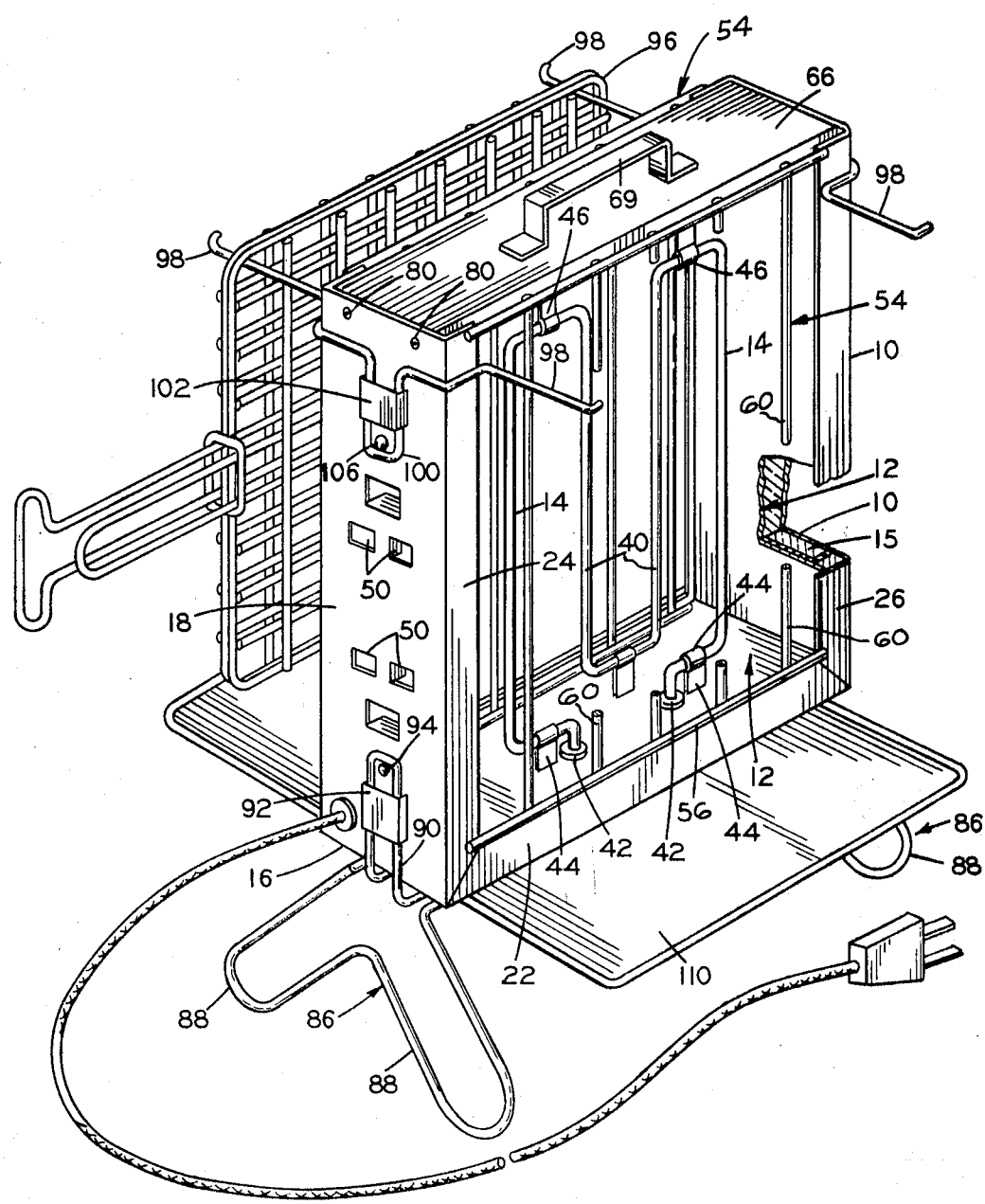
FIG. 1 is a pictorial view of a preferred embodiment of a grill formed in accordance with the present invention.
Figure 3:
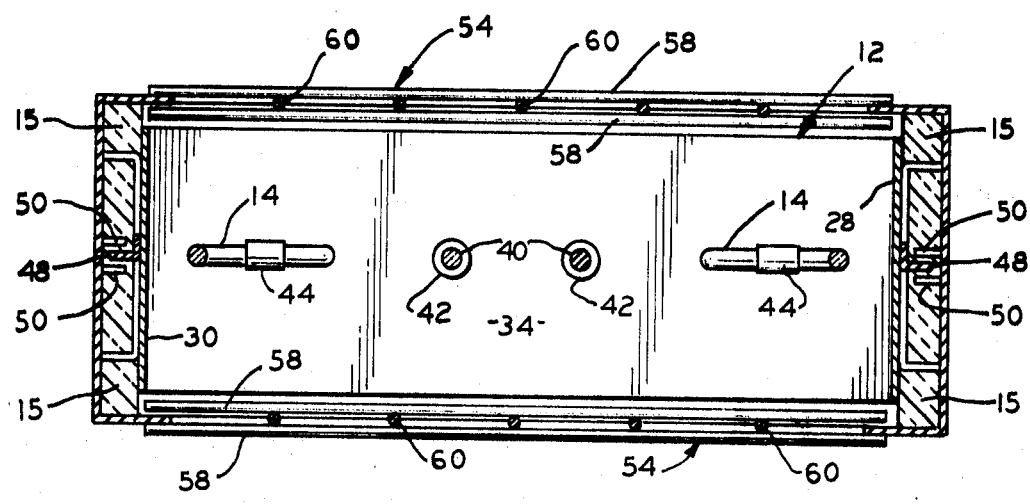
FIG. 3 is a cross-sectional plan view taken on line 3-3 of FIG. 1.

Referring to FIG. 1 it will be seen that the grill assembly shown comprises an outer frame or housing forming member 10 in which is removably positioned an inner frame 12 which carries the heating element 14. As best shown in FIG. 3, the inner frame 12 is slidably received within the outer frame 10 and, spaced therefrom so as to provide an insulating air space 15 into which heat insulating material may be positioned if desired.

Figure 2:
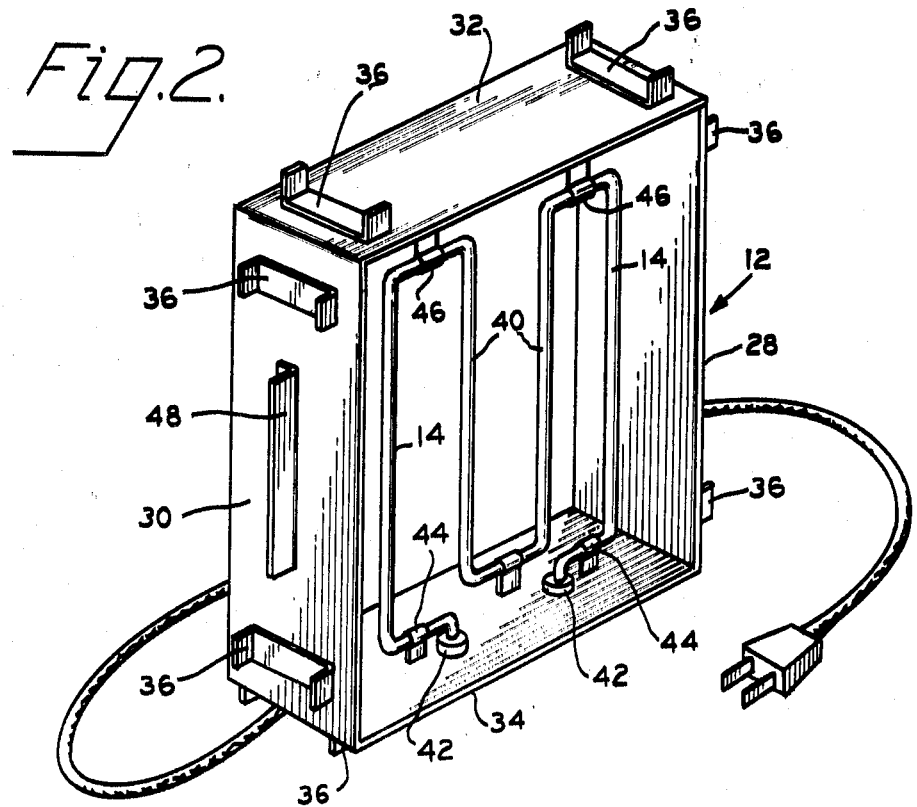
FIG. 2 is a pictorial view of the inner frame unit and heater element of the device of FIG. 1.

Referring again to FIG. 1, it will be noted that the outer frame 10 is formed from a single piece of sheet metal bent into a generally U-shape so as to have a bottom wall 16 and upwardly extending end walls 18 and 20. Inwardly extending flanges 22, 24 and 26 integrally formed along the marginal edges of the walls 16, 18 and 20 respectively. The inner frame 12, as best shown in FIG. 2, is formed from a single strip of sheet metal bent into a rectangular box frame as shown, and having sidewalls 28 and 30, and top and bottom walls 32 and 34, respectively. The frame is, as previously mentioned formed from a single sheet of metal and is joined, for example, along the mating edges at the corner between wall 28 and the top 32 such as by welding.

Means are provided on the frame member 12 to maintain it spaced a uniform distance away from the inner walls of the outer frame member 10. These means could take a variety of forms and could, for example, be outwardly turned flanges formed on the marginal edges of the walls 28, 30 and the bottom 34. In the embodiment under consideration however, the means comprise small U-shaped tabs 36 which are positioned at opposite ends of the walls 28, 30 as well as, on the top 32 and the bottom 34. These tabs are arranged so as to engage the inner walls of the frame member 10 and maintain proper spacing between the frames 10 and 12.

In the embodiment under consideration, the electrical heating element 14 is a standard resistance type element formed with a configuration generally as best shown in FIG. 2. Note that it is provided with a central reverse bend portion 40 to assure a relatively uniform heat output. The element 14 is supported at its lower end by the usual connector 42 and also, is engaged by insulating supports 44 which connect between the lower wall 34 and the first outwardly flaring portions of the heating element. At its upper end the U-bend portions are both supported by similar insulating supports 46 which connect to the top wall 32. This provides a relatively rigid and stable support for the heating element while maintaining it spaced from the inner walls of the frame member 12.

As previously mentioned, the inner frame is slidably received within the outer frame 10 and the outwardly extending tab portions 36 maintained it properly spaced from the inner wall frame 10. Additionally, in the embodiment under consideration, vertically extending angle members 48 are attached generally centrally of the sidewalls 28 and 30. The angles 48 have one leg extending outwardly slightly less than the distance between the outer face or surface of the inner frame 12 and the inner surface of the outer frame 10. Extending inwardly from the outer frame 10 are guide portions 50 which provide a groove into which the angles 48 are received for centering the inner frame laterally relative to the outer frame. The inwardly extending portions 50 can be formed from separate elements rigidly connected to the walls 28 and 30 or, alternately, can be formed by bending tabs inwardly from the outer wall. The use of inwardly extending bent tabs is somewhat less desirable however, because it requires a cover plate over the sidewalls to shield the openings formed by the tabs.

Preferably, the open space between the inner frame and the outer frame is filled with a suitable high temperature insulation so that heat can not readily be conducted from the inner frame to the outer frame. As can be appreciated the arrangement thus far described is relatively simple and rugged and formed by conventional sheet metal operations.

As best shown in FIG. 3 and 4, the laterally open sides of the frame assembly thus far described are provided with removable grid assemblies 54. Each of the grid assemblies 54 comprise upper and lower pairs of wires or rods 56 and 58 which are spot welded to the opposite ends of vertically extending wires 60. In the embodiment shown, the wires 56,58 are welded on directly opposite sides of the vertically extending wires Preferably, preferably, the wires on one side of the vertical wires are slightly below those on the opposite side. Referring to FIG. 3, it can be seen that the pairs of wires 56,58 are of a length and spacing such that the grid assemblies 54 can be slid vertically down the inwardly extending flanges 24,26. The innermost of the wires 56,58 in the assembled position are the lower wires and engage the bottom wall of the frame. The slidable arrangement of the grid assemblies 54 permits easy removal of the grids for cleaning. Merely by sliding them upwardly they can be removed for separate washing.

The grid assemblies 54 are maintained in position by the lid assembly shown in FIG. 5 and 6. Additionally the lid assembly is arranged so as to further interlock and make rigid the frames 10 and 12. As shown in FIG. 5 and 6, the cover member comprises a top piece 66 which has a downwardly turned outer flange 68 extending completely about its outer periphery. A handle 69 is positioned centrally of the top 66 and connected thereto in any convenient manner. Positioned subjacent the member 69 and received within the flanges 68 is a bottom member 70 having upward turned flanges 72 about its outer edge. The flanges 72 terminate in laterally extending portions 74 which are sized to engage the inner wall of the flanges 68 and provide a gap or recess 76. The cover member is sized so that the upper edges of the vertical sidewalls 18 and 20 are received in the recesses 76. Additionally, screws or any other suitable fasteners 80 extend inwardly through the end flanges of the cover and through the upper edges of the sidewalls 18 and 20 to firmly lock the cover in position while permitting it to be removed for cleaning of the grids 54. Additionally, the inner chamber of the cover between the top portion 69 and the lower member 70 is filled with suitable insulating material 82.

Referring again to FIG. 1 it will be noted that the assembly is maintained in a vertical position by leg units 86. The leg units 86 are formed from a single piece of wire or rod which is bent generally in the shape of a Y with two outwardly flaring leg forming sections 88, and a vertically extending section 90. The sections 90 are arranged to be received within a lanced and outwardly vent receiving portion 92 formed in the sidewalls 18 and 20 of the outer frame 10. The portions 92 are arranged so as to closely and tightly receive the portions 90 of the legs. Additionally, a small tab or peened portion 94 is formed in the sidewalls so as to releasably lock the leg assemblies in position. As can be appreciated, this arrangement allows the leg assemblies to be quickly removed for cleaning or shipping.

Additionally, means are provided for supporting the food holders or food support members 96 in a vertical position adjacent the opened sidewalls of the grill assembly. These means could take many forms but, in the preferred embodiment, comprise bent rod or wire members 98 which have outwardly extending portions integrally formed with the bent and downwardly extending portion 100. These members are each identical and are received in lanced and outwardly bent tab portions 102 formed generally as the previously mentioned portions 92. Additionally, a peened portion 106 is positioned so as to releasably snap the supports in position on the frame.

This arrangement permits the food holders or support members 96 to be simply slid on the wires and their spacings from the heating unit varied depending upon the degree of cooking or heating required.

The food holders supports could take many forms but are shown as conventional hinge type grill units having opposed wire grid sections hingedly connected and provided with outward extending handles and a lock ring which permits the handles to be released opening the grill and receiving the food after which they may be closed and locked to securely hold the food. Only one of the grills 96 is shown it is to be appreciated that a second one can be mounted directly opposite the one shown in FIG. 1.

As can be appreciated, during cooking, food particles, grease and juices, may drip from the grills. For this reason a releasably tray member 110 is releasably and slidably supported under the grill in a position to receive the greases, etc. The member 110 is simply a shallow tray which is supported from small rods or wires which extend inwardly from the legs. Note that the tray member can be slid in and out as desired for cleaning and washing or storage.

As can be readily appreciated, may types of leg assemblies could be utilized for the invention. The FIG. 7 showing shows an integral leg and food support rod assembly which comprises the outward flared leg portions 112 and two upwardly extending wires 114 that are connected to the support wire 116 such as by tack welding. Positioned at the lower end of the vertically extending wires is a U-shaped snap frame or brace 118 which closely engages the outer portions of the flanges 24 and 26. Additionally, tabs or hooks 120 are provided to releasably engage in slots formed in the bottom wall and end wall respectively. Note that at the upper end the tab 122 extends into a slot 124 formed horizontally and adjacent the top edge of the wall whereas, a similar tab 126 is formed at the lower end and engages a slot 128 formed in the bottom wall parallel to the end wall. This arrangement permits the food support rods and the legs to be snapped on and off the device.

Referring again to the FIG. 1 showing it will be seen that the required electrical cord extends through the end wall of the unit from under the inner frame member 12. Additionally, positioned between the inner frame member 12 and the outer frame member 10 is a conventional mercury switch which is positioned to block the flow of current to the heating element if the grill is tipped over from the vertical position.

The invention has been described in great detail sufficient to any one of ordinary skill in the art to make and use the same obviously, modifications and alterations of the preferred embodiment will occur to others upon the reading and understanding of this invention. It is my intention to include all such modifications and alterations as part of my invention insofar as they come within the scope of the appended claims.

I claim:
1. A electric grill for grilling foodstuffs and the like comprising:
    a. a first generally U-shaped frame member having a bottom wall and vertically extending end walls, the top and sides of said member being open;
    b. flanges extending inwardly from the marginal edges of said bottom and sidewalls;
    c. a second frame member of generally rectangular configuration having open sidewalls positioned within said first frame member and spaced a short distance therefrom,
    d. a resistance heating element carried by said second frame member generally centrally thereof;
    e. grid members positioned across the open sides of said first frame member and slidably received on said flanges; and,
    f. leg and food support assemblies removably connected to said first frame member.
2. The grill as defined in claim 1 including a cover member positioned over the upper end of said first frame member and removably connected thereto.
3. The grill as defined in claim 2 wherein said cover member includes a downwardly extending flange which extends about the upper end of said first frame member.
4. The grill as defined in claim 1 wherein said leg and food support assembly comprise wire frames received in openings formed in said end walls of said first frame member.
5. The grill as defined in claim 1 including a insulation positioned between said first and second frame members.